June 21, 1960

M. S. DI PERNA 2,941,613

AIR GENERATOR ELECTRIC VEHICLE

Filed July 1, 1958

Mario S. Di Perna
INVENTOR.

BY Clarence A. O'Brien
and Harvey B. Jacobson
Attorneys

June 21, 1960 M. S. DI PERNA 2,941,613
AIR GENERATOR ELECTRIC VEHICLE
Filed July 1, 1958 3 Sheets-Sheet 2
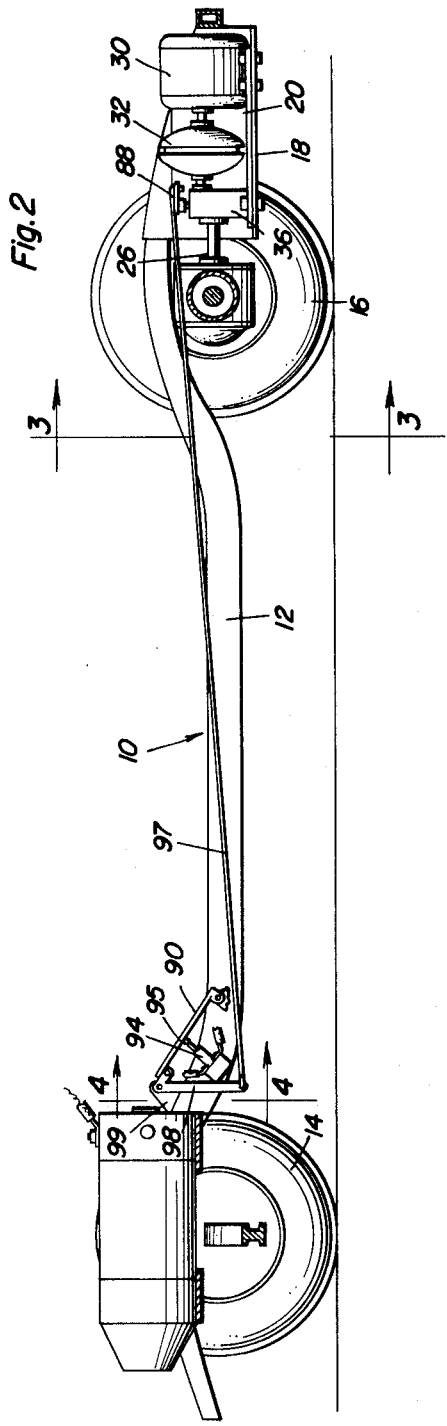
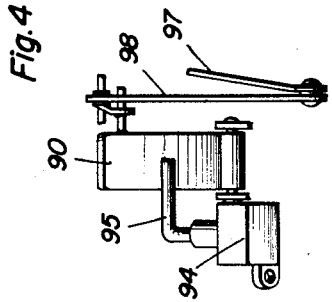
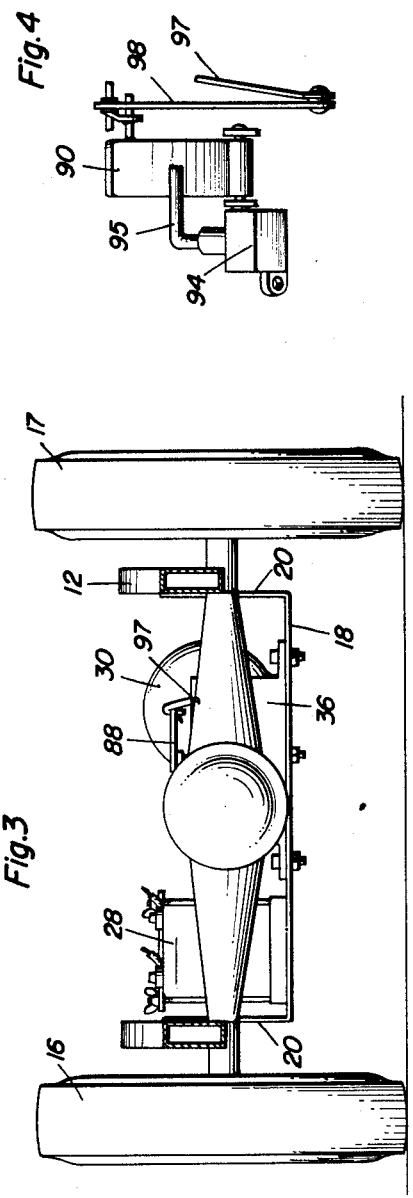
Mario S. Di Perna
INVENTOR.

June 21, 1960 M. S. DI PERNA 2,941,613
AIR GENERATOR ELECTRIC VEHICLE
Filed July 1, 1958 3 Sheets-Sheet 3
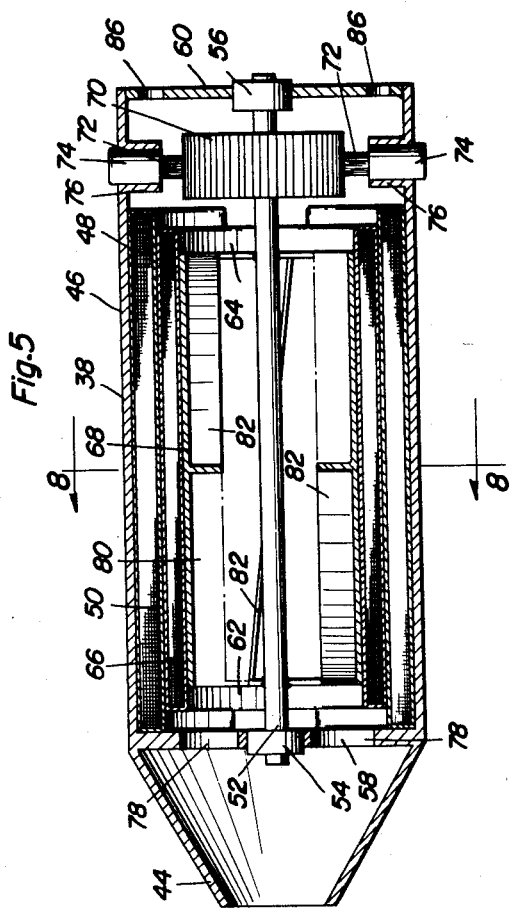
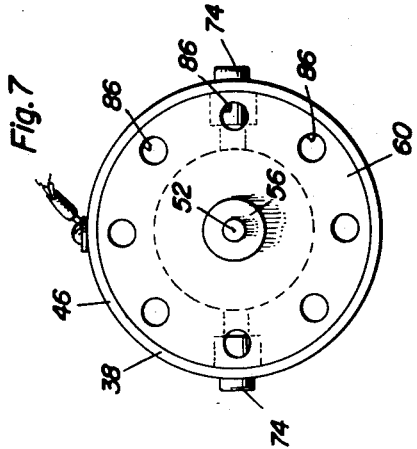
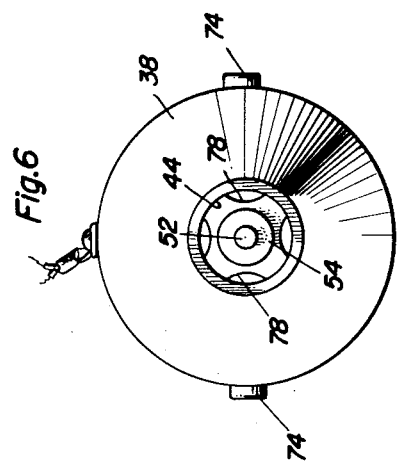
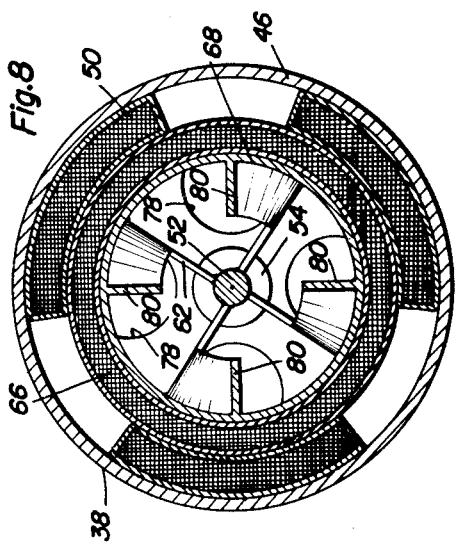
Mario S. DiPerna
INVENTOR.

United States Patent Office 2,941,613
Patented June 21, 1960

2,941,613

AIR GENERATOR ELECTRIC VEHICLE

Mario S. Di Perna, 27 Banks St., Somerville, Mass.

Filed July 1, 1958, Ser. No. 745,914

3 Claims. (Cl. 180—65)

This invention relates to a propulsion system for a vehicle, and the principles of the invention are applicable to air, land or sea vehicles, although the following description of a typical embodiment of the invention deals with a land vehicle. Accordingly, the term "motor vehicle" as used herein is intended to mean a vehicle with a propulsion motor, regardless of the medium (air, land or water) in which the motor vehicle travels.

A motor vehicle constructed in accordance with the invention can be made in varying sizes from a very small vehicle that is adapted to be used by children to a full scale passenger car, truck, airplane, boat and others. The vehicle has a driven train that includes a storage battery and motor energized by the battery together with a differential. There is a gear selector, such as a conventional speed reducer capable of shifting to various gear ratios, and a fluid coupling. The gear reducer and fluid coupling establish a drive connection between the motor and the differential enabling the operator of the motor vehicle to select the desired speed of vehicle movement.

A special generator is adapted to apply a charge to the battery when the vehicle is in forward motion. This special generator is operated by ram pressure of air turning a vaned armature. As the vehicle is moved forward the dnyamic pressure generated by the forward motion of the vehicle surrenders some of its energy to the armature, turning it in an electromagnetic field and thereby generating voltage and current that is regulated and delivered to the storage battery.

The speed and actuation is selected by the motorist pressing a single pedal with which there is a switch operatively connected to close the generator circuit, and a mechanical connection to the speed reducer. This mechanical connection can be a linkage, a push-pull cable or the like. The sequence of operation is alterable, although a suggested sequence has the switch closing upon initial depression of the pedal and then upon further depression of the pedal, the mechanical linkage causes the adjustable gear reducer to be actuated.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 2 is a sectional view taken on the line 2—2 of Figure 1.

Figure 3 is a transverse sectional view taken on the line 3—3 of Figure 2.

Figure 4 is an enlarged sectional view taken on the line 4—4 of Figure 2.

Figure 5 is a sectional view on enlarged scale and taken on the line 5—5 of Figure 1.

Figure 6 is a front end view of the generator in Figure 5.

Figure 7 is a rear end view of the generator in Figure 5.

Figure 8 is a sectional view taken on the line 8—8 of Figure 5.

Figure 1:
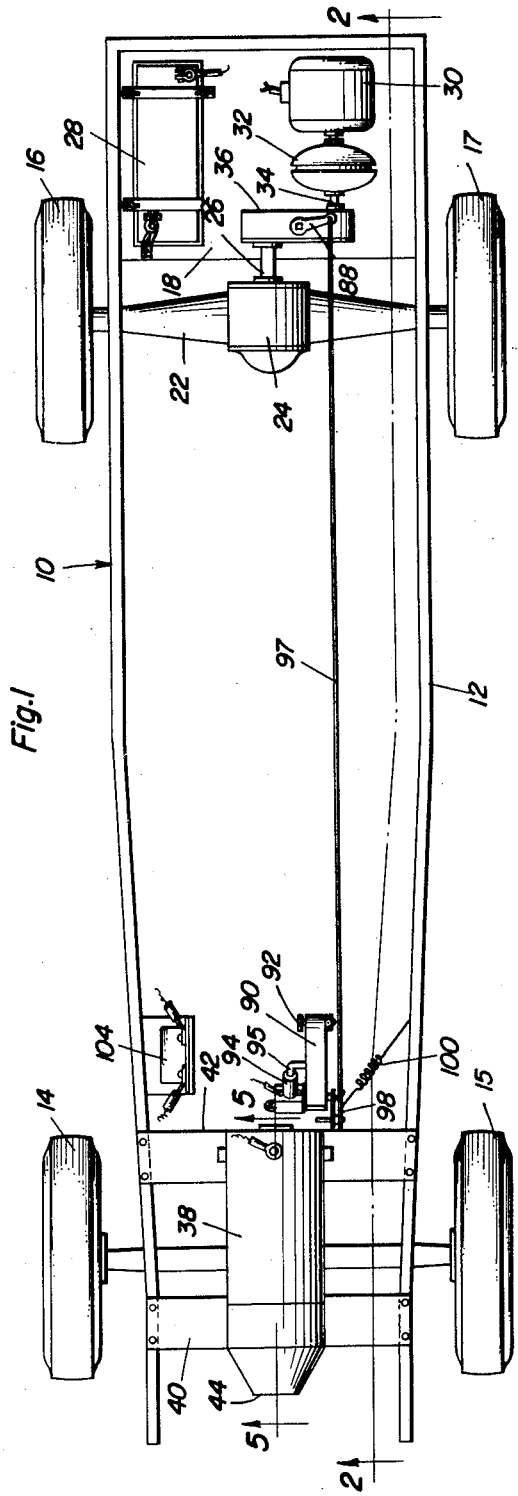
Figure 1 is a diagrammatic top plan view of a motor vehicle chassis fitted with the structural organization for driving the motor vehicle.

In the accompanying drawings there is a motor vehicle fragmentarily shown. This vehicle 10 has a chassis 12, front wheels 14 and 15, together with rear wheels 16 and 17. The chassis has a platform 18 located at the rear end thereof and attached to the chassis by hangers 20 (Figure 3).

The rear wheels 16 and 17 are shown at the ends of axle housing 22, the latter also supporting a differential 24 having shaft 26 protruding therefrom. Storage battery 28, which in one embodiment of the invention is a 32 volt battery, is carried by platform 18 and held in place by a battery clamp. A reversible (to obtain forward and reverse vehicle movement) D.C. electric motor 30 is bolted or otherwise attached to the platform 18. The motor has a fluid coupling 32 drivingly connected to it and driven by the motor. The output shaft 34 of the fluid coupling is secured to the power input shaft of a conventional gear reducer 36 of the adjustable type. One such gear reducer that is commercially available changes gear ratios between 1 to 3 and 3 to 1. The output shaft of the gear reducer 36 is attached to the shaft 26 of the differential.

Air operated generator 38 is attached to a pair of frame cross members 40 and 42 preferably at the front of the chassis 12. This is so that the air inlet scoop 44, preferably a Venturi, can be exposed to ram air pressure as the motor vehicle is moved in a forward direction.

The generator 38 is constructed of a housing or case 46 with an electromagnetically energized field coil group 48 mounted on it. The armature 50 of the generator has an armature shaft 52 mounted in bearings 54 and 56. The bearing 54 is attached to the supporting web 58 near the front of case 46, and bearing 56 is carried by rear end wall 60 of the case. The armature has radial arms 62 near its front and radial arms 64 near its rear end. Armature windings 66 are carried by a sleeve 68 which is rigidly attached to the radial arms 62 and 64. The dimensioning of parts is such that the armature has its windings close to the field coils 50, and shaft 52 is coaxial with the case 38.

Commutator 70 is attached to the shaft 52 downstream of (with respect to the movement of air) the field and armature of the generator. Brushes 72 are carried by brush holders 74 in sockets 76 in case 38.

In operation of the generator air enters the air inlet 44 designed for efficient air flow, for instance as a Venturi. The air passes through openings 78 in support 58 and through the hollow passageway 80 in the armature. Sleeve 68 encloses a circular bore that forms the side wall of passage 80, and there are a plurality of vanes 82 attached to the inner surface of the wall of sleeve 68 and protruding inwardly toward the axis of rotation of the armature. These vanes terminate short of the shaft 52, and they are smoothly curved in a longitudinal direction from the front or leading ends of the vanes to the rear or trailing ends of the vanes. The vanes cause the armature to rotate due to the positions and shapes of the vanes, as air rushes through passageway 80. Then the air passes over the commutator, keeping it cool, and is discharged through the openings 86 in the end wall 60.

There are means for controlling the energization of the generator circuit and also for moving arm 88 that is attached to the control shaft of gear reducer 36. These means preferably consist of an accelerator pedal 90 mounted for pivotal movement in the motor vehicle, for instance on the floor thereof by pivot 92. Switch 94 is structurally mounted on a bracket in the motor vehicle and has a switch operator 95 in the path of travel of pedal 90. The switch 94 is of the type which is spring pressed to an open position but is closed upon movement of the switch operator 95. A mechanical linkage, either rigid or flexible, is connected to arm 88. The illustration has a long link 97 pivotally attached to arm 88 and pivotally attached to bell crank 98. The bell crank is mounted intermediate its ends and for pivotal movement on mounting bracket 99 that is carried by a part of the motor vehicle chassis or something attached to the chassis. The extremity pin of the crank 98 is in the path of pivotal movement of the pedal 90 so that as the pedal is depressed there is a corresponding movement of bell crank 98 and this movement is transmitted through link 97 to arm 88. Return spring 100 is attached to a part of the linkage, for instance to the bell crank 98 and to a stationary part of the vehicle, for instance a bracket on the frame or chassis 12.

Figure 9:
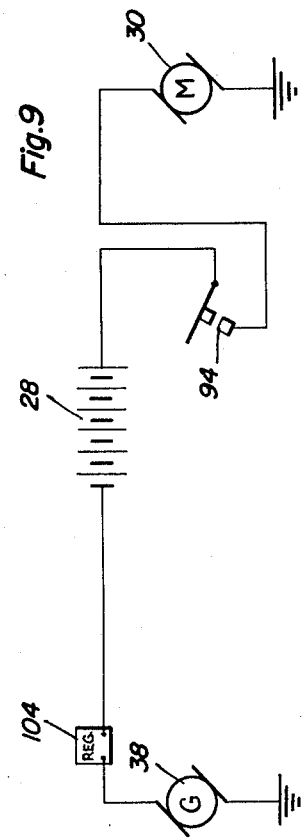
Figure 9 is an electrical diagram.

In operation the pedal 90 is depressed. The initial movement of the pedal closes switch 94 thereby completing the electrical circuit shown in Figure 9. The storage battery then conducts to motor 30. The initial turning of the motor is absorbed in coupling 32. At this time the gear reducer 36 can be at a setting of zero output. Further depression of pedal 90 retains switch 94 in the closed condition but, through the linkage, moves control arm 88 changing the gear ratio or preferably, first adjusting the gear reducer so that there is power output delivered to shaft 26 and then further movement of the pedal 90 adjusts the gear reducer through its range of ratios. The farther the pedal 90 is pushed the greater movement is there in arm 88 and this is in a direction to increase the speed output at shaft 26.

As the motor vehicle moves forward air enters the air inlet 44 and passing through passageway 80, causes the armature of the generator to rotate. This generates a voltage and current which is controlled by a voltage and current regulator 104. Circuit wiring extends from the generator to the regulator and from the regulator to the battery 28. Further wiring extends from the battery to switch 94 (Figure 9), and then from switch 94 to the motor.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:
1. In a vehicle, an electric motor means, a storage battery operatively connected to said motor means for energization thereof, mechanical transmitting means operatively connected to and driven by said motor means for propelling said vehicle, air-operated generator means operatively connected to said storage battery for charging thereof in response to vehicle movement and single control means including foot-operated means operatively connected to said transmitting means for control thereof and for simultaneously rendering effective the connections between the battery and motor means and between the generator means and battery.

2. The combination as defined in claim 1, wherein said generator means comprises an armature and a field coil, a case supporting said armature and said field coil, said armature having an air passageway, vanes in said passageway and attached to said armature, a venturi air inlet connected with said case and in alignment with said passageway and facing frontally on the vehicle so that air under ram pressure enters said inlet and said passageway thereby impinging on said vanes and rotating said armature.

3. The combination as defined in claim 1, wherein said generator means comprises, a case with an air inlet, an armature having an armature shaft mounted for rotation in said case, said armature including windings, a sleeve on which said windings are disposed, means attaching said sleeve to said shaft for rotation therewith, said sleeve having a passageway therethrough, longitudinally curved vanes in said passageway and attached to said armature and in alignment with said air inlet so that as air passes through said inlet it passes through said passageway and impinges on said vanes to rotate said armature, said generator having electromagnetic field coils carried by said case and concentrically arranged with respect to said armature, a current and voltage regulator, circuit wiring extending from said generator to said regulator and from said regulator to said battery.

References Cited in the file of this patent
UNITED STATES PATENTS

| 1,179,407 | Decker | Apr. 18, 1916 |
| 1,181,988 | Breitung | May 9, 1916 |
| 1,223,495 | Kelley | Apr. 24, 1917 |
| 1,562,903 | Miller | Nov. 24, 1925 |
| 1,634,167 | Wilson | June 28, 1927 |
| 1,671,033 | Kimura | May 22, 1928 |
| 2,148,804 | Claytor | Feb. 28, 1939 |
| 2,445,058 | Fields | July 13, 1948 |
| 2,555,807 | Morris | June 5, 1951 |
| 2,825,418 | Kershman | Mar. 4, 1958 |

OTHER REFERENCES

Publication: "Electrical Engineering," November 1955, pp. 1004–1006; "Emergency Electrical Systems for Jet Aircraft," by Merle Smallberg.